United States Patent Office 3,535,133
Patented Oct. 20, 1970

3,535,133
ALKALI-FREE ELECTRONIC GLASS AND
METHOD OF MANUFACTURE
Saleem Akhtar, Wakefield, Mass., assignor to Transitron
Electronic Corporation, Wakefield, Mass.
No Drawing. Filed Apr. 24, 1968, Ser. No. 723,909
Int. Cl. C03c 3/08; C23d 5/08; C03b 5/22
U.S. Cl. 106—53        5 Claims

ABSTRACT OF THE DISCLOSURE

An alkali-free glass composition for use in the electronics industry is provided having a composition comprising silicon dioxide, aluminum oxide, boron oxide, lead oxide, calcium oxide, zinc oxide and magnesium oxide in predetermined amounts for use in encapsulation, glassivation and passivation of various semiconductor devices. The method of manufacture comprises homogeneously mixing the above-noted constituents, melting and refining under predetermined conditions.

BACKGROUND OF THE INVENTION

Various compositions have been used in the semiconductor field by the electronics industry to provide for ambient protection or to provide a second level on silicon chips for metal contacts and other thin film passive components. Materials such as plastics and resins, low-melting glasses in the system selenium-arsenic-sulphur, and high melting borosilicate glasses of the pyrex type have often been used. Thin films of the above materials can be deposited on silicon chips by known methods. For example, thin glass films are commonly obtained by well-known sputtering, centrifuging or thermal vacuum evaporation processes.

The choice of the correct type of glass or ceramic material used in such thin films is extremely important in order to obtain high reliability and low cost in passivation films. It is common to assess the suitability and usefulness of glass compositions with regard to several factors which include (1) coefficient of thermal expansion, (2) electrical properties, such as resistivity, dielectric strength, and ionic mobility, (3) chemical durability, (4) firing temperatures, (5) active impurities and (6) mechanical properties such as deformation and softening temperature.

Most ordinary commercial glass cannot be used for glassivation or passivation of semiconductor devices due to large mismatch in thermal expansion characteristics of the glass and underlying silicon bases, poor chemical stability to various processing reagents used in semiconductor manufacture and the presence of highly mobile ions such as $Li^+$, $Na^+$ and $K^+$ in many commercial glasses which tends to deteriorate the underlying semiconductor device and cause electrical problems.

Because of the above considerations it has been difficult to obtain an alkali-free glass composition suitable for use in surface coating such as in encapsulation, passivation or glassivation of silicon base semiconductor devices such as transistors, diodes and rectifiers.

SUMMARY OF THE INVENTION

According to the invention, an alkali-free electronic glass composition is provided which has excellent adhesion to surfaces of silicon bases. The composition comprises silicon dioxide, aluminum oxide, boron oxide, lead oxide, calcium oxide, zinc oxide and magnesium oxide in predetermined proportion.

According to the method of this invention, the constituent oxides are milled to form a homogeneous mixture. The mixture is then melted in a batch preferably in an oxidizing atmosphere at a temperature progressively increasing from 1000° C.±10° C. to 1200° C. and then maintained at between 1200° C. and 1250° C. for a predetermined time period while preferably mechanically stirring the melt to insure homogeneity. The melt is preferably quenched to obtain a frit which can be dried prior to use.

The resulting glass has a coefficient of thermal expansion closely matching that of silicon and preferably $59 \times 10^{-7}/°$ C.± $5 \times 10^{-7}/°$ C. within a temperature range of from 20 to 300° C. The deformation temperature of the glass is in the range of from 430° C. to 470° C. and preferably 450° C. when computed from the maximum height of the standard expansion curve as known in the art. The glass is highly useful for encapsulating semiconductor devices because of its desirable thermal coefficient of expansion, good electric properties including resistivity and dielectric strength, high chemical durability, low firing temperature and lack of active impurities which would interfere with semiconducting properties of a device which it overlies. The glass is totally devoid of lithium, sodium and potassium ions which are highly mobile and tend to deteriorate semiconductor devices. The glass composition of this invention is referred to herein as "ion-free" or "alkali-free" to indicate the absence of such highly mobile ions as lithium, sodium and potassium which are normally present in most glass compositions such as silicate glasses and which ions have high mobility which is a complex function of the composition and structure of glass.

DESCRIPTION OF PREFERRED EMBODIMENTS

The chemical composition and tolerances in weight percent of the constituent oxides of the glass composition of this invention are given in the table below:

| No. | Constituent oxide | Weight percent | Tolerance, wt. percent, ± | Mol percent |
|---|---|---|---|---|
| 1 | $SiO_2$ | 15.0 | 3 | 22.5 |
| 2 | $Al_2O_3$ | 4.0 | | 3.5 |
| 3 | $B_2O_3$ | 28.0 | 5 | 35.6 |
| 4 | $PbO$ | 35.0 | 10 | 14.0 |
| 5 | $CaO$ | 4.0 | 1 | 6.0 |
| 6 | $ZnO$ | 12.0 | 4 | 13.4 |
| 7 | $MgO$ | 2.0 | | 4.5 |

In the table mol percent bases are indicated in addition to weight percent but the following discussion will consider only the weight percent of the constituent oxides based on the weight of the entire composition.

It is important that the rather small range of limits given in the tolerance column of the tables be followed in order to obtain desired thermal expansion, deformation temperature, electrical, mechanical and chemical properties desired. The weight percent column gives the exact weight percent of each constituent oxide of the preferred embodiment of this invention. However, the amounts of each constituent oxide can be varied within the ranges set forth in the tolerance column. Moreover, minor constituents such as FeO, $As_2O_3$ and $Sb_2O_3$ can be incorporated in the glass composition in small amounts of from 0.1 to 1.0 weight percent in order to facilitate the mechanisms of melting and refining without substantially varying the desirable properties of the composition noted in the table. When the predetermined proportions of materials as recited in the table are used, yields of an extremely transparent and homogeneous glass are obtained.

It should be noted that no highly mobile alkali ions are present in the alkali-free electronic glass composition of this invention. The silicon dioxide acts as a binder and provides a structural network for the glass. The aluminum oxide provides insulating and dielectric properties as well as acting to control hardness, as does the boron oxide. The lead oxide aids in controlling the thermal expansion characteristics and acts to soften the glass. The calcium oxide adds to the high resistivity of the glass composition. Zinc oxide and magnesium oxide increase the tensile strength of the glass composition. In addition to the functions noted above, the constituent oxides can act to perform other functions in the glass. It is important that the proportions noted be maintained in order to prevent devitrification with resulting opacity and crystallization of the glass during forming or thereafter and to provide desirable properties as noted above.

In the method of this invention, the constituent oxides are weighed out in the weight percents noted in column 3 of the table above, in their purest commercially available form, and formed into a batch by ball milling preferably using high purity alumina grinding media for one hour so as to yield a homogeneous mixture. A clean platinum-crucible (preferably made from 60% Pt and 40% Rh alloy) previously kept under a dry oxygen atmosphere is used to melt the batch. The batch is melted in an electric furnace with an initial temperature maintained at 1000±10° C. The temperature of the furnace is slowly raised to 1200° C. over a one-half hour period and the batch free time is one hour. The furnace atmosphere is an oxidizing one which is maintained by the use of a conventional nozzle system to preferably provide a smooth flow of about 50 cc./min. of pure dry oxygen through the chamber of the furnace.

After the batch free time, the temperature of the furnace is raised by 50° C. and the melt maintained at a temperature of from about 1200° C. to 1250° C. for two hours. Preferably the melt is mechanically stirred in the furnace to insure homogeneity. After the two hour period, a very fluid, transparent and homogeneous melt is obtained whereupon the platinum crucible is removed from the furnace chamber and the melt quenched in distilled water preferably saturated with pure oxygen at room temperature to obtain a frit. The resulting frit is dried in an oven at preferably 250° C., preferably under a vacuum, for about three hours and is then maintained dry by storage in a dessicator prior to use. If desired, the homogeneous melt after the two hour period can be poured out on a clean steel plate to study melting behavior and homogeneity as by pouring a portion of the melt onto a steel plate in the form of a disc about one centimeter thick which can later be reduced to pieces of any required size and dimension.

The resulting frit can be formed into uniform thin glass films by conventional methods such as sputtering, centrifuging or thermal vacuum evaporation. The uniform thin glass films are preferably used with a layer thickness of from one-half micron to five microns and preferably three microns. The base for the glass films is silicon whose surface may be coated with conventional silicon coatings known in the semiconductor art such as silicon oxide. Extremely good bonds are obtained which are particularly useful in glassivation and passivation of silicon base transistors, diodes and rectifiers. The silicon bases can have conventional dopants and additives known in the semiconductor art where N and P interfaces extend within and may extend to surfaces of the bases.

While specific embodiments of the present invention have been shown and described, it should be understood that many variations thereof are possible and are within the scope of this invention. For example, the specific melt times and temperatures are highly preferred to obtain transparent and homogeneous glass although in some cases the time periods can vary as can the temperatures employed but in all cases, the melt is maintained between about 1200° C and 1250 ° C.

In view of the many modifications possible, this invention is to be limited only by the spirit and scope of the appended claims.

What is claimed is:

1. An alkali-free, transparent, homogeneous, electronic glass composition having good bonding properties with silicon, said composition consisting essentially of the following constituent oxides within the ranges stated in percent by weight:

| | |
|---|---|
| Silicon dioxide | 12–18 |
| Aluminum oxide | 4 |
| Boron oxide | 23.0–33.0 |
| Lead oxide | 25.0–45.0 |
| Calcium oxide | 3.0–5.0 |
| Zinc oxide | 8.0–16.0 |
| and | |
| Magnesium oxide | 2.0 |

2. An alkali-free, transparent, homogeneous, electronic glass composition in accordance with claim 1 wherein said constituent oxides are present in substantially the following amounts in weight percent:

| | |
|---|---|
| Silicon dioxide | 15.0 |
| Aluminum oxide | 4.0 |
| Boron oxide | 28.0 |
| Lead oxide | 35.0 |
| Calcium oxide | 4.0 |
| Zinc oxide | 12.0 |
| and | |
| Magnesium oxide | 2.0 |

3. An alkali-free, transparent, homogeneous, electronic glass composition in accordance with claim 1 and further comprising from 0.1 to 1.0 weight percent of FeO.

4. An alkali-free, transparent, homogeneous, electronic glass composition in accordance with claim 1 and further comprising from 0.1 to 1.0 weight percent of $As_2O_3$.

5. An alkali-free, transparent, homogeneous, electronic glass composition in accordance with claim 1 and further comprising from 0.1 to 1.0 weight percent of $Sb_2O_3$.

References Cited

UNITED STATES PATENTS

| | | | |
|---|---|---|---|
| 2,425,032 | 8/1947 | Deyrup | 106—49 |
| 3,151,982 | 10/1964 | Corrsin | 106—49 |
| 3,437,892 | 4/1969 | Hoffman | 106—49 |

TOBIAS E. LEVOW, Primary Examiner

M. L. BELL, Assistant Examiner

U.S. Cl. X.R.
117—201; 65—134